United States Patent [19]
Ravel et al.

[11] Patent Number: 5,406,829
[45] Date of Patent: Apr. 18, 1995

[54] TEMPERATURE CONTROL FOR CHEMICAL SENSORS

[75] Inventors: Mihir K. Ravel; Steven H. Pepper, both of Portland, Oreg.

[73] Assignee: Tektronix, Inc., Wilsonville, Oreg.

[21] Appl. No.: 229,899

[22] Filed: Apr. 19, 1994

[51] Int. Cl.[6] .................. G01N 31/06; G01K 11/22
[52] U.S. Cl. .................. 73/24.01; 73/579; 73/31.05
[58] Field of Search ......... 73/24.01, DIG. 1, 23.21, 73/23.10, 24.03, 579, 31.05, 31.06

[56] References Cited

U.S. PATENT DOCUMENTS

| | | | |
|---|---|---|---|
| 3,164,004 | 1/1965 | King, Jr. | 73/23 |
| 3,756,068 | 9/1973 | Villarroel et al. | 73/24.01 |
| 3,848,457 | 11/1974 | Behymer | 73/24.01 |
| 3,879,992 | 4/1975 | Bartera | 73/30 |
| 3,895,912 | 7/1975 | Naumann | 23/255 E |
| 4,258,563 | 3/1981 | Yasuda et al. | 73/23.21 |
| 4,312,228 | 1/1982 | Wohltjen | 73/597 |
| 4,399,686 | 8/1983 | Kindlund et al. | 73/23 |
| 4,498,330 | 2/1985 | Hosoya | 73/23.21 |
| 4,503,703 | 3/1985 | Pagel | 73/24.01 |
| 4,533,520 | 8/1985 | Bossart et al. | 422/96 |
| 4,730,478 | 3/1988 | Gedeon | 23/23.21 |
| 4,759,210 | 7/1988 | Wohltjen | 73/23 |
| 4,860,573 | 8/1989 | Barendz et al. | 73/24.01 |
| 5,012,668 | 5/1991 | Haworth | 73/24.06 |
| 5,042,288 | 8/1991 | Vig | 73/24.01 |
| 5,149,197 | 9/1992 | Rokos et al. | 374/117 |
| 5,289,715 | 3/1994 | Staples et al. | 73/24.01 |
| 5,323,636 | 6/1994 | McGowan et al. | 73/24.01 |

OTHER PUBLICATIONS

"Surface–Acoustic–Wave Piezoelectric Microbalance" Langley Research Center, Hampton, Vir.

*Primary Examiner*—Hezron E. Williams
*Assistant Examiner*—J. David Wiggins
*Attorney, Agent, or Firm*—Francis I. Gray; John D. Winkelman

[57] ABSTRACT

A temperature control system for acoustic wave chemical sensors monitors the frequency output from a reference sensor packaged within a heat conductive case with a test sensor. Since the frequency output fluctuates as a function of temperature, variations in frequency from a nominal value representing a desired steady state temperature for the sensors are detected and used as a control signal for a heating element attached to the heat conductive case.

2 Claims, 1 Drawing Sheet

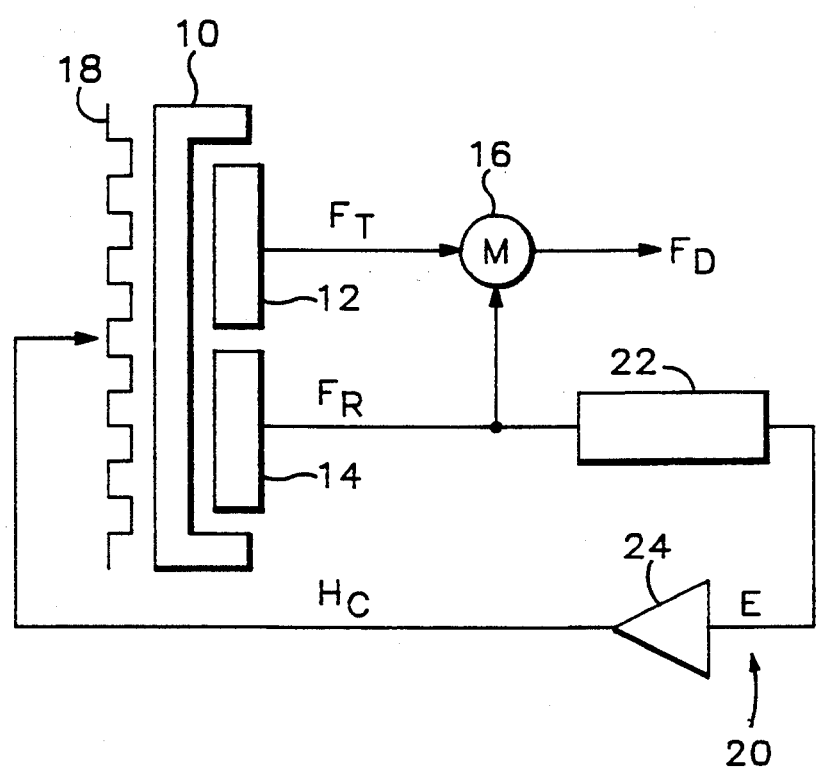

TEMPERATURE CONTROL FOR CHEMICAL SENSORS

BACKGROUND OF THE INVENTION

The present invention relates to chemical sensors, and more particularly to temperature control for chemical sensors to more closely maintain the temperature of the sensors at a desired steady state value.

Acoustic wave chemical sensors detect the presence of an analyte chemical by a change in the acoustic properties, such as resonant frequency, caused by absorption of the analyte chemical by a thin film coated on a piezoelectric device. These sensors are very temperature sensitive, and systems incorporating them need to provide means for controlling the device temperature. A common sensor package, such as that disclosed in NASA Tech Briefs, April 1993, encloses two sensors within a metallic case incorporating a temperature sensor, one chemical sensor being a reference sensor that is isolated from a fluid being measured and the other being a test sensor across which the fluid flows. The frequency outputs of the two chemical sensors are mixed together to produce a difference frequency. The difference frequency is a measure of the analyte chemical in the fluid flowing across the test sensor. The case is heated by a heating element controlled by a feedback loop from the temperature sensor, which maintains a constant case temperature. However since the test sensor is exposed to the environment containing the analyte chemical, the temperature of the test sensor is not necessarily equal to the temperature of the case. Also the acoustic nature of the chemical sensor makes direct attachment of the temperature sensor to the chemical sensor difficult.

What is needed is an apparatus and technique for accurately controlling the temperature of the sensors in the package case.

SUMMARY OF THE INVENTION

Accordingly the present invention provides temperature control for an acoustic wave chemical sensor by monitoring the frequency of a reference sensor in the same case with a test sensor. The changes in frequency of the reference sensor reflect changes due to temperature. A frequency counter/discriminator converts the frequency variations into an error signal that is fed back to a heating element that heats the case.

The objects, advantages and other novel features of the present invention are apparent from the following detailed description when read in conjunction with the appended claims and attached drawing.

BRIEF DESCRIPTION OF THE DRAWING

The FIGURE is a block diagrammatic view of a temperature control system for acoustic wave chemical sensors according to the present invention.

DESCRIPTION OF THE PREFERRED EMBODIMENT

Referring now to the FIGURE a pair of chemical sensors 12, 14 are located within a common heat conductive case or on a common supporting substrate 10. One of the sensors is a test sensor 12 that is exposed to a fluid that has an analyte chemical to be measured. The other sensor is a reference sensor 14 that is not exposed to the fluid. An electrical signal from each sensor 12, 14, representing the resonant frequency $f_T$, $f_R$ of each sensor, is input to a mixer 16 that provides an output frequency $f_D$ which is the difference in frequency between the test and reference sensor resonant frequencies. This is a conventional measurement scheme using a two sensor package. The case 10 has a heating element 18 attached to it which is controlled by a heater control signal $H_c$.

The heater control signal $H_c$ is generated by a feedback loop 20 that includes a frequency counter/discriminator 22 and a feedback loop amplifier/filter 24. The frequency signal $f_R$ from the reference sensor 14 is input to the frequency counter/discriminator 22 to produce an error signal E that is a measure of the offset in frequency between $f_R$ and a constant baseline frequency $f_B$. The error signal E is input to the amplifier/filter 24 to produce the heater control signal $H_c$. Since the resonant frequency $f_R$ of the reference sensor 14 is a function of its temperature, by monitoring the frequency output of the reference sensor 14 the case or substrate 10 is maintained at a temperature by the heating element 18 that keeps the temperature of the sensors 12, 14 at the desired steady state temperature without the need of an additional temperature sensor.

Thus the present invention provides temperature control for chemical sensors by monitoring the frequency of a reference sensor packaged with a test sensor within a heated case, providing a heater control signal as a function of the frequency to maintain the temperature of the sensors at a desired steady state value.

What is claimed is:

1. A system comprising:
    a chemical sensor package having a pair of temperature sensitive chemical sensors in a common temperature environment, a fluid containing an analyte chemical to be measured flowing across one of the sensors as a test sensor, the other sensor being a reference sensor isolated from the fluid flow, each sensor providing a frequency signal as an output;
    means for determining a difference in frequency between the outputs of the sensors, the difference in frequency being a measure of the amount of the analyte chemical in the fluid;
    means for heating the common temperature environment in response to a control signal; and
    means for generating the control signal as a function of the frequency signal from the reference sensor to maintain the temperature of the sensors at a desired steady state value.

2. The system as recited in claim 1 wherein the generating means comprises:
    means for determining a frequency value for the frequency signal from the reference sensor, the frequency value being a function of temperature; and
    means for converting the frequency value into the control signal.

* * * * *